United States Patent
Kimura et al.

(10) Patent No.: US 8,594,873 B2
(45) Date of Patent: Nov. 26, 2013

(54) POWER SUPPLY SYSTEM FOR ELECTRIC POWERED VEHICLE AND CONTROL METHOD THEREOF

(75) Inventors: Masaru Kimura, Toyota (JP); Junta Izumi, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 0 days.

(21) Appl. No.: 13/320,858

(22) PCT Filed: Jun. 2, 2009

(86) PCT No.: PCT/JP2009/060031
§ 371 (c)(1),
(2), (4) Date: Nov. 16, 2011

(87) PCT Pub. No.: WO2010/140213
PCT Pub. Date: Dec. 9, 2010

(65) Prior Publication Data
US 2012/0065827 A1    Mar. 15, 2012

(51) Int. Cl.
*B60L 11/00* (2006.01)
*H02P 4/00* (2006.01)
*H02J 7/34* (2006.01)

(52) U.S. Cl.
USPC .............................. 701/22; 318/139; 320/116

(58) Field of Classification Search
USPC .............................. 320/116; 318/139; 701/22
See application file for complete search history.

(56) References Cited

U.S. PATENT DOCUMENTS

| 2004/0135544 A1* | 7/2004 | King et al. | 320/116 |
| 2008/0067972 A1* | 3/2008 | Takami et al. | 320/103 |

FOREIGN PATENT DOCUMENTS

| JP | 2008-109840 A | 5/2008 |
| JP | 2008-167620 A | 7/2008 |
| JP | 2008-260346 A | 10/2008 |
| JP | 2009-018713 A | 1/2009 |

* cited by examiner

*Primary Examiner* — Fadey Jabr
*Assistant Examiner* — Martin Weeks
(74) *Attorney, Agent, or Firm* — Kenyon & Kenyon LLP (57) ABSTRACT

A power supply system for a hybrid vehicle includes a main power storage device and a plurality of sub power storage devices used selectively. When an SOC of one of the plurality of sub power storage devices decreases to a predetermined value or smaller, an ECU selects this sub power storage device as a sub power storage device to be charged. The ECU controls a connecting unit such that the sub power storage device to be charged is connected to a second converter. Furthermore, the ECU selects the HV mode as the travel mode. In the HV mode, electrical energy stored in an electric powered vehicle is maintained because of electric power generation by an engine.

4 Claims, 6 Drawing Sheets

POWER SUPPLY SYSTEM FOR ELECTRIC POWERED VEHICLE AND CONTROL METHOD THEREOF

This is a 371 national phase application of PCT/JP2009/060031 filed 2 Jun. 2009, the contents of which are incorporated herein by reference.

TECHNICAL FIELD

The present invention relates to a power supply system for an electric powered vehicle and a control method thereof, and more particularly to charge/discharge control of a power supply system including a plurality of power storage devices.

BACKGROUND ART

Electric powered vehicles such as hybrid vehicles, electric vehicles and fuel cell vehicles that can travel by using electrical energy have been developed and put to practical use as environmentally-friendly vehicles. An electric powered vehicle is equipped with a motor for generating vehicle driving force and a power storage device for storing driving electric power of the motor.

In the hybrid vehicles, there has been proposed a configuration in which a power supply outside the vehicle (also referred to as "external power supply" hereinafter) is used to charge a vehicle-mounted power storage device. Therefore, it has been desired to increase the distance traveled by using electric power stored in the power storage device. It is to be noted that charging the vehicle-mounted power storage device by using the external power supply is also simply referred to as "external charging" in the following.

Japanese Patent Laying-Open No. 2008-109840 (PTL 1), for example, describes a power supply system having a plurality of power storage devices (batteries) connected in parallel. In the power supply system described in PTL 1, a voltage converting device (converter) serving as a charge/discharge adjustment mechanism is provided for each power storage device (battery). In contrast, Japanese Patent Laying-Open No. 2008-167620 (PTL 2) describes a power supply apparatus for a vehicle equipped with a main power storage device and a plurality of sub power storage devices, wherein a converter for the main power storage device and a converter shared by the plurality of sub power storage devices are provided. With such a configuration, the number of converters can be suppressed and the amount of energy that can be stored can be increased.

In particular, in the configuration described in PTL 2, one of the plurality of sub power storage devices is selectively connected to the converter, and the main power storage device and the selected sub power storage device supply driving electric power of the motor for driving the vehicle. In this power supply apparatus, electric power supply is controlled based on an SOC (State Of Charge) indicating the remaining capacity of the power storage device. Specifically, when the SOC of the sub power storage device in use decreases, a new sub power storage device is connected to the converter. By sequentially using the plurality of sub power storage devices, the distance traveled by using electrical energy stored in the vehicle (EV (Electric Vehicle) travel distance) can be increased.

CITATION LIST

Patent Literature

PTL 1: Japanese Patent Laying-Open No. 2008-109840
PTL 2: Japanese Patent Laying-Open No. 2008-167620

SUMMARY OF THE INVENTION

Technical Problem

In the power supply system described in PTL 2, when the SOC of the sub power storage device in use decreases, this sub power storage device is electrically disconnected from the converter. The SOC of the sub power storage device, however, may continue to decrease even after the sub power storage device is disconnected from the converter, due to self-discharge and the like of the sub power storage device. If the sub power storage device is not charged, discharging of the sub power storage device continues, which may bring the sub power storage device into the overdischarge state.

The present invention has been made to solve the above problems and an object of the present invention is to, in an electric powered vehicle equipped with a power supply system including a main power storage device and a plurality of sub power storage devices, avoid overdischarge of each of the plurality of sub power storage devices.

Solution to Problem

A power supply system for an electric powered vehicle according to an aspect of the present invention is directed to a power supply system for an electric powered vehicle equipped with a motor serving as a power source and with an electric power generation mechanism configured to be capable of generating electric power while the vehicle is traveling, the power supply system including: a main power storage device configured to be rechargeable; first and second voltage converters; a plurality of sub power storage devices provided in parallel to one another and each being rechargeable; a connecting unit; a charging unit; a plurality of detecting units; a state of charge calculating unit; a selecting unit; a travel mode control unit; and a connection control unit. The first voltage converter is provided between the main power storage device and a power feed line electrically connected to the motor and the electric power generation mechanism, and is configured to make bidirectional voltage conversion. The second voltage converter is provided between the plurality of sub power storage devices and the power feed line, and is configured to make bidirectional voltage conversion between one of the plurality of sub power storage devices and the power feed line. The connecting unit is provided between the plurality of sub power storage devices and the second voltage converter, and is configured to control connection and disconnection between the plurality of sub power storage devices and the second voltage converter. The charging unit is configured to charge the main power storage device and each of the plurality of sub power storage devices by using a power supply outside the electric powered vehicle. The plurality of detecting units are configured to detect states of the main power storage device and the plurality of sub power storage devices, respectively. The state of charge calculating unit is configured to calculate a remaining capacity estimated value of each of the main power storage device and the plurality of sub power storage devices based on a result of detection by each of the plurality of detecting units. The selecting unit selects, as a sub power storage device to be charged, one sub power storage device having the remaining capacity estimated value that falls below a predetermined value, from among the plurality of sub power storage devices when the remaining capacity estimated value of any one of the plurality of sub power storage devices falls below the predetermined value. The travel mode control unit has a first mode in which the electric powered vehicle travels by using electrical energy stored in the electric powered vehicle, and a second mode in which the electrical energy is maintained within a certain range by using the electric power generation mechanism. The travel mode control unit selects the second mode when the sub power storage device to be charged is selected. The connection control unit controls the connecting unit such that the sub power storage device to be charged is connected to the second voltage converter when the sub power storage device to be charged is selected.

Preferably, each of the plurality of detecting units receives electric power from a corresponding power storage device and detects the state of the corresponding power storage device.

Preferably, the power supply system further includes a control target setting unit configured to set a control target of a remaining capacity of each of the main power storage device and the plurality of sub power storage devices. The predetermined value is smaller than the control target of each of the plurality of sub power storage devices and larger than a value of the remaining capacity corresponding to an overdischarge state of each of the plurality of sub power storage devices. The travel mode control unit selects the first mode until all of the remaining capacity estimated values of the main power storage device and the plurality of sub power storage devices decrease to the respective control targets, and selects the second mode after all of the remaining capacity estimated values decrease to the respective control targets. The connection control unit connects one sub power storage device selected sequentially from among the plurality of sub power storage devices to the second voltage converter in the first mode, and disconnects each of the plurality of sub power storage devices from the second voltage converter in response to switching from the first mode to the second mode.

Preferably, the control target setting unit sets the control target of the remaining capacity of the sub power storage device to be charged to be higher than the control target of each of the plurality of sub power storage devices in the first mode, when the sub power storage device to be charged is connected to the second voltage converter.

Preferably, the selecting unit selects the sub power storage device to be charged when the electric powered vehicle ends traveling.

A control method of a power supply system for an electric powered vehicle according to another aspect of the present invention is directed to a control method of a power supply system for an electric powered vehicle equipped with a motor serving as a power source and with an electric power generation mechanism configured to be capable of generating electric power while the vehicle is traveling. The power supply system includes: a main power storage device configured to be rechargeable; first and second voltage converters; a plurality of sub power storage devices provided in, parallel to one another and each being rechargeable; a connecting unit; a charging unit; and a plurality of detecting units. The first voltage converter is provided between the main power storage device and a power feed line electrically connected to the motor and the electric power generation mechanism, and is configured to make bidirectional voltage conversion. The second voltage converter is provided between the plurality of sub power storage devices and the power feed line, and is configured to make bidirectional voltage conversion between one of the plurality of sub power storage devices and the power feed line. The connecting unit is provided between the plurality of sub power storage devices and the second voltage converter, and is configured to control connection and disconnection between the plurality of sub power storage devices and the second voltage converter. The charging unit is configured to charge the main power storage device and each of the plurality of sub power storage devices by using a power supply outside the electric powered vehicle. The plurality of detecting units are configured to detect states of the main power storage device and the plurality of sub power storage devices, respectively. The control method includes the steps of: calculating a remaining capacity estimated value of each of the main power storage device and the plurality of sub power storage devices based on a result of detection by each of the plurality of detecting units; selecting, as a sub power storage device to be charged, one sub power storage device having the remaining capacity estimated value that falls below a predetermined value, from among the plurality of sub power storage devices when the remaining capacity estimated value of any one of the plurality of sub power storage devices falls below the predetermined value; and selecting one mode from a first mode in which the electric powered vehicle travels by using electrical energy stored in the electric powered vehicle, and a second mode in which the electrical energy is maintained within a certain range by using the electric power generation mechanism. In the step of selecting one mode, the second mode is selected when the sub power storage device to be charged is selected. The control method further includes the step of controlling the connecting unit such that the sub power storage device to be charged is connected to the second voltage converter when the sub power storage device to be charged is selected.

Preferably, each of the plurality of detecting units receives electric power from a corresponding power storage device and detects the state of the corresponding power storage device.

Preferably, the predetermined value is smaller than a control target of each of the plurality of sub power storage devices and larger than a value of a remaining capacity corresponding to an overdischarge state of each of the plurality of sub power storage devices. In the step of selecting one mode, the first mode is selected until all of the remaining capacity estimated values of the main power storage device and the plurality of sub power storage devices decrease to the respective control targets, and the second mode is selected after all of the remaining capacity estimated values decrease to the respective control targets. The control method further includes the steps of: connecting one sub power storage device selected sequentially from among the plurality of sub power storage devices to the second voltage converter in the first mode; and disconnecting each of the plurality of sub power storage devices from the second voltage converter in response to switching from the first mode to the second mode.

Preferably, the control target of the remaining capacity of the sub power storage device to be charged is higher than the control target of each of the plurality of sub power storage devices in the first mode.

Preferably, in the step of selecting one sub power storage device, the sub power storage device to be charged is selected when the electric powered vehicle ends traveling.

Advantageous Effects of Invention

According to the present invention, in an electric powered vehicle equipped with a power supply system including a main power storage device and a plurality of sub power storage devices, overdischarge of the plurality of sub power storage devices can be avoided.

DESCRIPTION OF EMBODIMENTS

Embodiments of the present invention will be described in detail hereinafter with reference to the drawings, in which the same or corresponding portions are denoted with the same reference characters, and description thereof will not be repeated.

Figure 1:
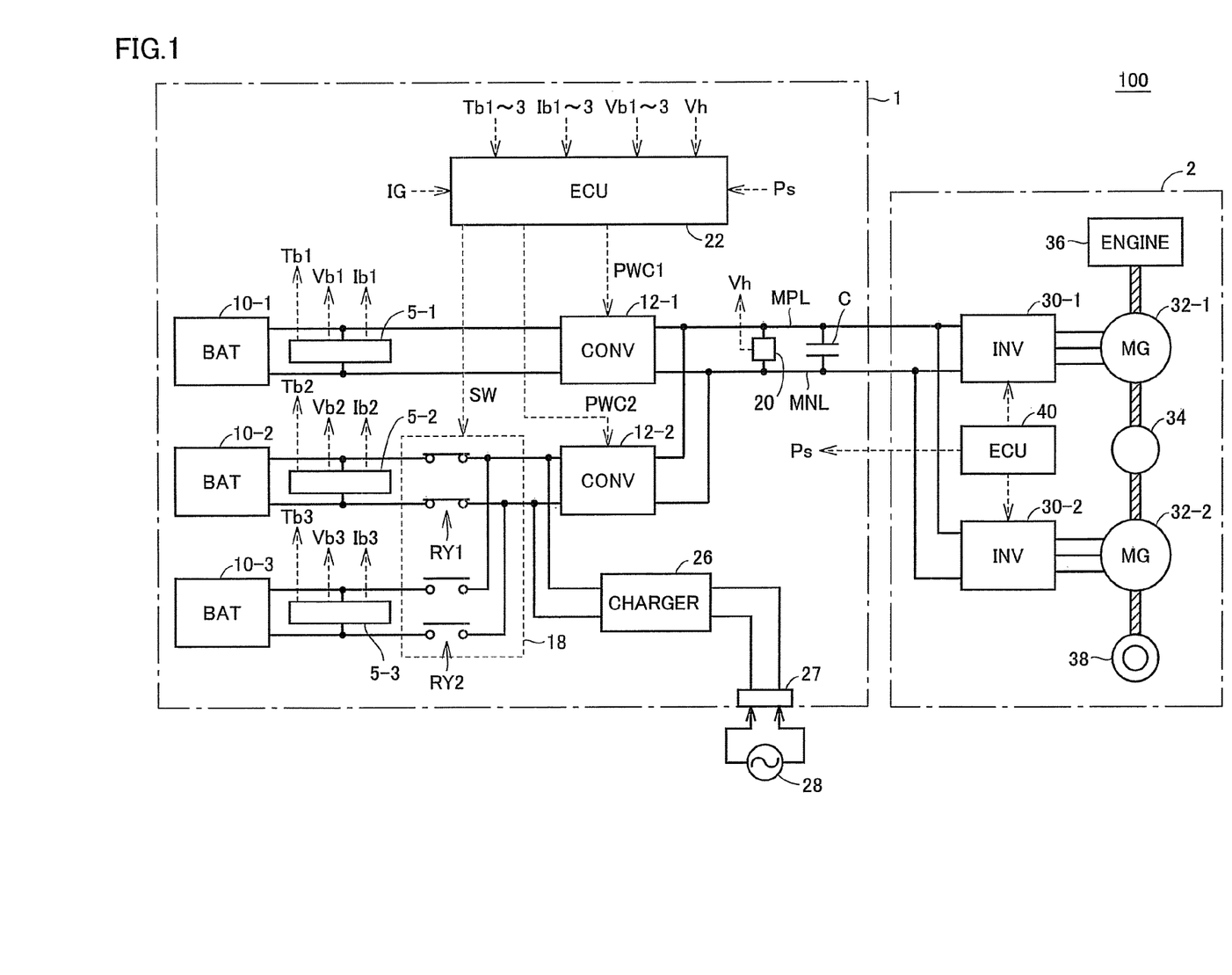
FIG. 1 is an overall block diagram of a hybrid vehicle shown as a typical example of an electric powered vehicle including a power supply system according to an embodiment of the present invention.

FIG. 1 is an overall block diagram of a hybrid vehicle shown as a typical example of an electric powered vehicle including a power supply system according to an embodiment of the present invention. Referring to FIG. 1, a hybrid vehicle 100 includes a power supply system 1 and a driving force generating unit 2. Driving force generating unit 2 includes a first inverter 30-1, a second inverter 30-2, a first MG (Motor-Generator) 32-1, a second MG 32-2, a power split device 34, an engine 36, a driving wheel 38, and an ECU (Electronic Control Unit) 40.

First MG 32-1, second MG 32-2 and engine 36 are coupled to power split device 34. This hybrid vehicle 100 travels by using driving force from at least one of engine 36 and second MG 32-2. Motive power generated by engine 36 is divided by power split device 34 into two paths, that is, one path through which the motive power is transmitted to driving wheel 38 and the other path through which the motive power is transmitted to first MG 32-1.

Each of first MG 32-1 and second MG 32-2 is an alternating rotating electric machine and is formed by, for example, a three-phase alternating rotating electric machine including a rotor having a permanent magnet embedded therein. First MG 32-1 generates electric power by using the motive power of engine 36 divided by power split device 34. For example, when the SOC of a power storage device (described below) included in power supply system 1 decreases, engine 36 starts, first MG 32-1 generates electric power, and the generated electric power is supplied to power supply system 1. In other words, in hybrid vehicle 100, first MG 32-1 constitutes "electric power generation mechanism."

In the present embodiment, the SOC refers to the current remaining capacity with respect to the capacity when the power storage device is fully charged, which is expressed in percentage.

Second MG 32-2 generates driving force by using at least one of electric power supplied from power supply system 1 and electric power generated by first MG 32-1. The driving force of second MG 32-2 is transmitted to driving wheel 38. During braking of the vehicle, driving wheel 38 drives second MG 32-2 and second MG 32-2 operates as a generator. As a result, second MG 32-2 operates as a regenerative brake that converts braking energy to electric power. The electric power generated by second MG 32-2 is supplied to power supply system 1.

Power split device 34 is formed by a planetary gear including a sun gear, a pinion gear, a carrier, and a ring gear. The pinion gear engages the sun gear and the ring gear. The carrier supports the pinion gear to allow rotation on its axis and is coupled to a crankshaft of engine 36. The sun gear is coupled to a rotation shaft of first MG 32-1. The ring gear is coupled to a rotation shaft of second MG 32-2.

First inverter 30-1 and second inverter 30-2 are connected to a power feed line MPL and a ground line MNL. First inverter 30-1 and second inverter 30-2 convert DC electric power supplied from power supply system 1 to AC electric power, and output the AC electric power to first MG 32-1 and second MG 32-2. In addition, first inverter 30-1 converts AC electric power generated by first MG 32-1 to DC electric power. Second inverter 30-2 converts AC electric power generated by second MG 32-2 to DC electric power. The DC electric power from first inverter 30-1 and second inverter 30-2 is output to power supply system 1 as regenerative electric power.

Each of first inverter 30-1 and second inverter 30-2 has a circuit configuration of a general three-phase inverter formed by a plurality of power semiconductor switching elements (simply referred to as "switching element" hereinafter). Each inverter performs the switching operation in response to a drive signal from ECU 40, thereby driving a corresponding MG.

ECU 40 calculates a requested power Ps to power supply system 1, based on a detection signal by each sensor that is not shown, the travel situation, the opening degree of an accelerator, and the like. ECU 40 calculates a torque target value and a rotation speed target value of first MG 32-1 and second MG 32-2, based on calculated requested power Ps. ECU 40 controls first inverter 30-1 and second inverter 30-2 such that the torque generated by first MG 32-1 and second MG 32-2 as well as the rotation speed of first MG 32-1 and second MG 32-2 attain target values.

In addition, ECU 40 outputs calculated requested power Ps to an ECU 22 (described below) in power supply system 1. When requested power Ps has a positive value, electric power is supplied from power supply system 1 to driving force generating unit 2. On the other hand, when requested power Ps has a negative value, charging electric power for the power storage device is supplied from driving force generating unit 2 to power supply system 1.

Power supply system 1 includes a first power storage device 10-1, a second power storage device 10-2, a third power storage device 10-3, a first converter 12-1, a second converter 12-2, a connecting unit 18, power feed line MPL, ground line MNL, and a smoothing capacitor C. Power supply system 1 further includes ECU 22 for controlling the operation of power supply system 1, monitoring units 5-1 to 5-3, a voltage sensor 20, a charger 26 used for external charging, and a vehicle inlet 27.

ECUs 22 and 40 described above are each formed by an electronic control unit having a not-shown CPU (Central Processing Unit) and a memory built thereinto, and are configured to perform operation processing using a value detected by each sensor and each monitoring unit, based on a map and a program stored in the memory. Alternatively, at least a part of the ECU may be configured to execute predetermined numerical/logical operation processing using hardware such as an electronic circuit.

Each of first power storage device 10-1, second power storage device 10-2 and third power storage device 10-3 is a rechargeable DC power supply and is formed by, for example, a secondary battery made of nickel hydride and lithium ion, a large-capacitance capacitor, and the like. First power storage device 10-1 is connected to first converter 12-1. Second power storage device 10-2 and third power storage device 10-3 are connected to second converter 12-2 with connecting unit 18 interposed therebetween.

Connecting unit 18 is provided between second and third power storage devices 10-2 and 10-3 and second converter 12-2. Connecting unit 18 includes switches RY1 and RY2. Each of switches RY1 and RY2 is typically formed by an electromagnetic relay.

Switch RY1 is disposed between second power storage device 10-2 and second converter 12-2. Switch RY2 is disposed between third power storage device 10-3 and second converter 12-2. ON/OFF of switches RY1 and RY2 is controlled in response to a control signal SW from ECU 22.

In the following, first power storage device 10-1 constantly used when power supply system 1 operates is also referred to as "main power storage device," and second power storage device 10-2 and third power storage device 10-3 that can be disconnected from power supply system 1 are also referred to as "sub power storage device." Furthermore, power storage devices 10-1 to 10-3 are collectively denoted simply as "power storage device."

First converter 12-1 and second converter 12-2 are connected to power feed line MPL and ground line MNL in parallel to each other. First converter 12-1 makes bidirectional voltage conversion between main power storage device 10-1 and power feed line MPL, based on a drive signal PWC1 from ECU 22.

Second converter 12-2 makes bidirectional voltage conversion between power feed line MPL and one sub power storage device (sub power storage device 10-2 or sub power storage device 10-3) electrically connected to second converter 12-2 by connecting unit 18, based on a drive signal PWC2 from ECU 22. It is to be noted that when sub power storage devices 10-2 and 10-3 are both disconnected from the second converter, the operation of second converter 12-2 stops.

Smoothing capacitor C is connected between power feed line MPL and ground line MNL to reduce a high frequency component of a DC voltage on power feed line MPL. Voltage sensor 20 detects a voltage Vh between power feed line MPL and ground line MNL, and outputs the detected value to ECU 22.

Monitoring unit 5-1 detects the state of main power storage device 10-1 by using a part of electric power stored in main power storage device 10-1. Specifically, monitoring unit 5-1 detects a temperature Tb1 and a voltage Vb1 of main power storage device 10-1 as well as a current Ib1 input/output to/from main power storage device 10-1. Monitoring unit 5-1 outputs each value of temperature Tb1, voltage Vb1 and current Ib1 to ECU 22 as the detected value.

Monitoring unit 5-2 detects the state of sub power storage device 10-2 by using a part of electric power stored in sub power storage device 10-2. Specifically, monitoring unit 5-2 detects a temperature Tb2 and a voltage Vb2 of sub power storage device 10-2 as well as a current Ib2 input/output to/from sub power storage device 10-2. Monitoring unit 5-2 outputs each value of temperature Tb2, voltage Vb2 and current Ib2 to ECU 22 as the detected value.

Monitoring unit 5-3 detects the state of sub power storage device 10-3 by using a part of electric power stored in sub power storage device 10-3. Specifically, monitoring unit 5-3 detects a temperature Tb3 and a voltage Vb3 of power storage device 10-3 as well as a current Ib3 input/output to/from sub power storage device 10-3. Monitoring unit 5-3 outputs each value of temperature Tb3, voltage Vb3 and current Ib3 to ECU 22 as the detected value. Each of monitoring units 5-1 to 5-3 is, for example, a semiconductor integrated circuit.

ECU 22 generates control signal SW and outputs control signal SW to connecting unit 18. As described above, control signal SW is set to turn on one of switches RY1 and RY2 or to turn off each of switches RY1 and RY2.

Based on the respective detected values from monitoring units 5-1 to 5-3 and voltage sensor 20 as well as requested power Ps from ECU 40, ECU 22 generates drive signals PWC1 and PWC2 for driving first converter 12-1 and second converter 12-2, respectively. ECU 22 outputs generated drive signals PWC1 and PWC2 to first converter 12-1 and second converter 12-2, respectively, and controls first converter 12-1 and second converter 12-2.

ECU 22 further controls the travel mode of hybrid vehicle 100. Specifically, when each power storage device is charged by using charger 26 described below, ECU 22 sets the initial travel mode to the EV mode. The EV mode refers to the mode in which hybrid vehicle 100 travels by mainly using electric power stored in each power storage device, without maintaining the SOC of each power storage device. When the SOC of each power storage device decreases to a corresponding control target value while the vehicle travels in the EV mode, ECU 22 changes the travel mode from the EV mode to the HV mode. The HV mode refers to the mode in which hybrid vehicle 100 travels while maintaining the SOC of each power storage device.

In the EV mode, hybrid vehicle 100 stops engine 36 and travels by using the output of second MG 32-2 unless the output power exceeding dischargeable electric power of the used power storage device is requested for entire hybrid vehicle 100. Therefore, the SOC of the used power storage device decreases gradually. On the other hand, in the HV mode, engine 36 operates as appropriate and first MG 32-1 generates electric power. Therefore, the SOC of each power storage device is maintained within a certain range. This "certain range" refers to a predetermined range whose center is a threshold value of the SOC when the travel mode is switched from the EV mode to the HV mode, for example.

Furthermore, ECU 22 controls charging/discharging of the power storage devices. ECU 22 calculates an electric power distribution ratio indicating a distribution ratio of charging/discharging electric power between main power storage device 10-1 and the sub power storage device (also referred to as "selected sub power storage device" hereinafter) electrically connected to second converter 12-2 by connecting unit 18. It is to be noted that ECU 22 makes a distinction between and calculates an electric power distribution ratio used in the EV mode and an electric power distribution ratio used in the HV mode.

Furthermore, ECU 22 controls first converter 12-1 such that voltage Vh is adjusted to a predetermined target voltage. ECU 22 controls second converter 12-2 such that a charging/discharging current of the selected sub power storage device matches a target amount. Consequently, the charging/discharging electric power of the selected sub power storage device is controlled. The charging/discharging electric power of main power storage device 10-1 is obtained by subtracting the charging/discharging electric power of the selected sub power storage device from the charging/discharging electric power (requested power Ps) of entire power supply system 1. By setting a target value for current control by second converter 12-2 in accordance with the calculated electric power distribution ratio, the electric power distribution ratio between main power storage device 10-1 and the selected sub power storage device can be controlled.

Charger 26 and vehicle inlet 27 are provided at hybrid vehicle 100 to charge each power storage device by using an external power supply. Charger 26 charges each power storage device with electric power from an external power supply 28. Charger 26 is connected, for example, between second converter 12-2 and connecting unit 18 to convert electric power (e.g., AC electric power) input from vehicle inlet 27 to electric power (DC electric power) for charging the power storage devices. Furthermore, the charger outputs the converted electric power to a power line between second converter 12-2 and connecting unit 18.

When charger 26 charges main power storage device 10-1, first and second converters 12-1 and 12-2 are driven as appropriate. Specifically, electric power from charger 26 is supplied to main power storage device 10-1 via second converter 12-2, power feed line MPL and ground line MNL, and first converter 12-1 in this order. Furthermore, when switch RY1 is turned on, the electric power from charger 26 is supplied to sub power storage device 10-2. Furthermore, when switch RY2 is turned on, the electric power from charger 26 is supplied to sub power storage device 10-3.

The configuration for charging the power storage devices by using the external power supply is not limited to the configuration shown in FIG. 1. For example, hybrid vehicle 100 may be configured such that a neutral point of a stator coil of first MG 32-1 and a neutral point of a stator coil of second MG 32-2 can be connected to an AC power supply. With such a configuration, electric power for charging each power storage device can be generated by AC-DC conversion by inverters 30-1 and 30-2. Alternatively, a configuration corresponding to a non-contact charging scheme in which electromagnetic coupling of the vehicle and the external power supply is employed may be applied to hybrid vehicle 100. Specifically, a primary coil is provided on the external power supply side and a secondary coil is provided on the vehicle side (vehicle inlet 27). By employing mutual inductance between the primary coil and the secondary coil, the vehicle can receive electric power from the external power supply even when the vehicle is not in contact with this external power supply.

When the state of a signal IG for activating the vehicle system shown in FIG. 1 changes from the OFF state to the ON state, ECU 22 activates power supply system 1. As a result, the vehicle goes into the state in which the vehicle can start traveling. For example, when the user presses a not-shown accelerator pedal, the vehicle starts traveling. On the other hand, when the state of signal IG changes from the ON state to the OFF state, ECU 22 sets the travel mode in the next traveling of the vehicle, and selects at least one power storage device used for this traveling from among main power storage device 10-1 and sub power storage devices 10-2 and 10-3.

Figure 2:
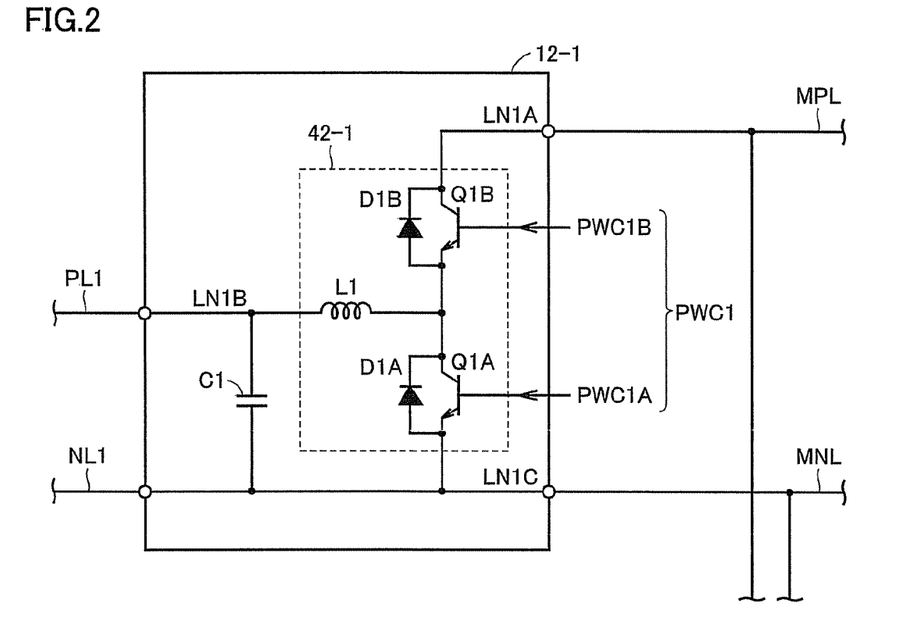
FIG. 2 is a circuit diagram showing a configuration of first and second converters 12-1 and 12-2 shown in FIG. 1.

FIG. 2 is a circuit diagram showing a configuration of first and second converters 12-1 and 12-2 shown in FIG. 1. Since the configuration and operation of each converter are similar, the configuration and operation of first converter 12-1 will be described as a typical example.

Referring to FIG. 2, first converter 12-1 includes a chopper circuit 42-1, a power supply line LN1A, a ground line LN1C, a line LN1B, and a smoothing capacitor C1. Chopper circuit 42-1 includes power semiconductor switching elements Q1A and Q1B, diodes D1A and D1B, and an inductor L1. In the present embodiment, an IGBT (Insulated Gate Bipolar Transistor) is described by way of example as the power semiconductor switching element (simply referred to as "switching element" hereinafter). It is to be noted that a power MOS (Metal Oxide Semiconductor) transistor, a power bipolar transistor or the like can also be used as the switching element.

Power supply line LN1A has one end connected to a collector of switching element Q1B, and the other end connected to power feed line MPL. Ground line LN1C has one end connected to a negative electrode line NL1, and the other end connected to ground line MNL.

Switching elements Q1A and Q1B are connected in series between ground line LN1C and power supply line LN1A. Specifically, an emitter of switching element Q1A is connected to ground line LN1C and the collector of switching element Q1B is connected to power supply line LN1A. Diodes D1A and D1B are connected in antiparallel to switching elements Q1A and Q1B, respectively. Inductor L1 is connected between line LN1B and a connection node between switching elements Q1A and Q1B.

Line LN1B has one end connected to a positive electrode line PL1, and the other end connected to inductor L1. Smoothing capacitor C1 is connected between line LN1B and ground line LN1C to reduce an AC component included in a DC voltage between line LN1B and ground line LN1C.

Chopper circuit 42-1 makes bidirectional DC voltage conversion between main power storage device 10-1 (FIG. 1) and power feed and ground lines MPL and MNL, in response to drive signal PWC1 from ECU 22 (FIG. 1). Drive signal PWC1 includes a drive signal PWC1A for controlling ON/OFF of switching element Q1A that fauns a lower arm element, and a drive signal PWC1B for controlling ON/OFF of switching element Q1B that forms an upper aim element. Basically, within a certain duty cycle (the sum of the ON period and the OFF period), switching elements Q1A and Q1B are subjected to ON/OFF control in a complementary manner except for the dead time period.

ECU 22 controls the duty ratio (ratio between the ON period and the OFF period) of switching elements Q1A and Q1B. When switching elements Q1A and Q1B are controlled such that the ON duty of switching element Q1A becomes large, the pump current amount flowing from power storage device 10-1 to inductor L1 increases, and thus, electromagnetic energy stored in inductor L1 increases. When switching element Q1A changes from the ON state to the OFF state, a current flows from inductor L1 through diode D1B to power feed line MPL. Since a large amount of electromagnetic energy is stored in inductor L1, the amount of current at this time is large. Therefore, the voltage of power feed line MPL rises.

On the other hand, when switching elements Q1A and Q1B are controlled such that the ON duty of switching element Q1B becomes large, a current flows from power feed line MPL through switching element Q1B and inductor L1 to power storage device 10-1. The amount of current at this time increases, and thus, the voltage of power feed line MPL drops.

As described above, by controlling the duty ratio of switching elements Q1A and Q1B, converters 12-1 and 12-2 can control the voltage of power feed line MPL or the direction of current (electric power) and the amount of current (the amount of electric power) input/output between power storage device 10-1 and power feed line MPL.

In addition, when switching element Q1B, which is the upper arm element, is fixed in the ON state and switching element Q1A, which is the lower arm element, is fixed in the OFF state, the voltage of power feed line MPL becomes substantially equal to the output voltage of power storage device 10-1. When converter 12-1 is controlled as described above, electric power loss due to ON/OFF of switching elements Q1A and Q1B does not occur. Thus, the efficiency of the converters, and in turn, the fuel efficiency of hybrid vehicle 100 are relatively enhanced.

Here, as seen from FIGS. 1 and 2, when sub power storage device 10-2 or 10-3 is connected to second converter 12-2 by connecting unit 18, a short circuit between main power storage device 10-1 and the selected sub power storage device (10-2 or 10-3) due to the diode element (D1B) of the upper arm of second converter 12-2 must be prevented. Therefore, voltage Vh of power feed line MPL must be higher than the output voltage of each of main power storage device 10-1 and the selected sub power storage device.

In addition, a lower limit value of voltage Vh is subjected to constraints in terms of control of MGs 32-1 and 32-2 as well. Specifically, in terms of MG control, it is preferable to make voltage Vh higher than the induced voltage of MGs 32-1 and 32-2. Therefore, practically, voltage Vh is controlled to be higher than both of the lower limit value in terms of battery constraints and the lower limit value in terms of MG motor control.

Therefore, when sub power storage device 10-2 or 10-3 is connected to second converter 12-2, the operation for boosting converters 12-1 and 12-2 is required to satisfy the lower limit value in terms of battery constraints, even in the case where voltage Vh can be reduced in terms of MG control, in particular the case where boosting of converters 12-1 and 12-2 is unnecessary.

When one sub power storage device remains connected to second converter 12-2 after all electric power of both of sub power storage devices 10-2 and 10-3, that is, all sub power storage devices is used up, the number of the power storage devices that can be used as an electric power buffer does not decrease. On the other hand, however, it is necessary to continue operating converters 12-1 and 12-2 in the boosting mode, and thus, reducing losses of the converters is not easy.

Therefore, by turning off each of switches RY1 and RY2 in connecting unit 18 after use of each sub power storage device is completed (i.e., in the HV mode), boosting in terms of battery constraints can become unnecessary when all sub power storage devices are electrically disconnected from the power supply system. Consequently, the operation of second converter 12-2 can be stopped, and in addition, electric power consumed at converters 12-1 and 12-2 can be suppressed by operating converter 12-1 in the voltage fixed mode when boosting of first converter 12-1 becomes unnecessary in terms of MG control.

When the temperature of the power storage device is extremely low or high, the amount of electric power that can be input/output to/from the power storage device decreases. In such a situation, even when the HV mode is selected, sub power storage device 10-2 or 10-3 is connected to second converter 12-2. As a result, the function as the electric power buffer can be ensured.

Figure 3:
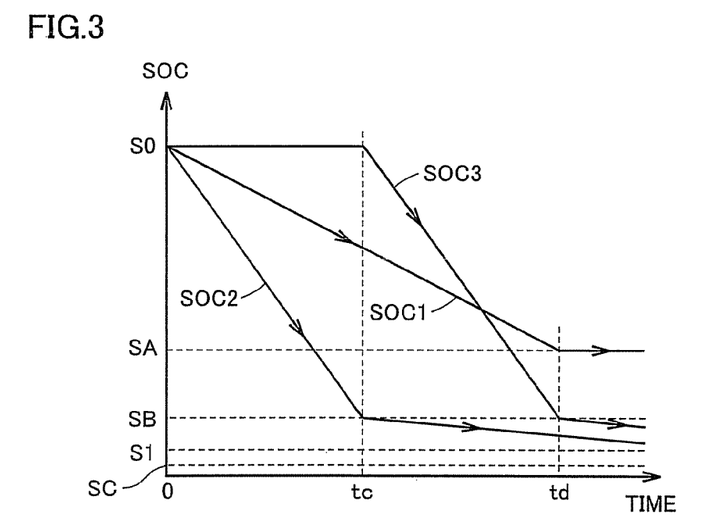
FIG. 3 is a conceptual diagram showing one example of a manner of use of power storage devices in the power supply system for the electric powered vehicle according to the present embodiment.

A manner of use of the power storage devices in the power supply system for the electric powered vehicle according to the present embodiment in accordance with a basic use pattern is shown in FIG. 3. Referring to FIG. 3, the control target value of the SOC (also referred to as "SOC control target" hereinafter) of main power storage device 10-1 is set to SA. On the other hand, the SOC control target of each of sub power storage devices 10-2 and 10-3 is set to SB. Here, SA>SB.

Before the electric powered vehicle starts traveling, main power storage device 10-1 and sub power storage devices 10-2 and 10-3 are charged by using the external power supply. As a result, when the electric powered vehicle starts traveling, the SOC of each of main power storage device 10-1 and sub power storage devices 10-2 and 10-3 has an initial value S0. Initial value S0 is 80(%), for example.

From when hybrid vehicle 100 starts traveling (time=0), hybrid vehicle 100 travels in the EV mode by using electric power of main power storage device 10-1 and sub power storage device 10-2. At this time, the electric power of sub power storage device 10-2 is used more preferentially than the electric power of main power storage device 10-1. Consequently, at time tc, the SOC (SOC2) of sub power storage device 10-2 decreases to control target SB. After time tc, sub power storage device 10-3, instead of sub power storage device 10-2, is connected to second converter 12-2 as the selected sub power storage device.

The electric power distribution ratio between the main power storage device and the selected sub power storage device until time tc is set such that the SOC (SOC1) of main power storage device 10-1 attains a predetermined value at time tc. This predetermined value is, for example, an intermediate value between initial value S0 (value at time=0) and control target SB of main power storage device 10-1.

After time tc, hybrid vehicle 100 travels in the EV mode by using electric power of main power storage device 10-1 and sub power storage device 10-3. The electric power of sub power storage device 10-3 is used more preferentially than the electric power of main power storage device 10-1. After time tc, the electric power distribution ratio is set such that a time when SOC1 reaches control target SA becomes equal to a time when an SOC3 reaches control target SB. Consequently, at time td, SOC1 reaches control target SA and SOC3 reaches control target SB. Therefore, at time td, the travel mode is switched from the EV mode to the HV mode.

In the HV mode, both of sub power storage devices 10-2 and 10-3 are electrically disconnected from second converter 12-2 while main power storage device 10-1 remains connected to first converter 12-1. In the HV mode, hybrid vehicle 100 travels such that SOC1 is maintained at control target SA. Therefore, in the HV mode, second converter 12-2 can be stopped and the upper arm of first converter 12-1 can be fixed in the ON state. Consequently, the efficiency of power supply system 1 can be enhanced, and thus, the fuel efficiency in the HV mode can be enhanced.

Even after both of sub power storage devices 10-2 and 10-3 are electrically disconnected from second converter 12-2, monitoring units 5-2 and 5-3 detect the state of sub power storage device 10-2 and the state of sub power storage device 10-3, respectively. Sub power storage devices 10-2 and 10-3 supply electric power to monitoring units 5-2 and 5-3 for the operation of monitoring units 5-2 and 5-3, respectively. Therefore, discharging of sub power storage devices 10-2 and 10-3 continues. Furthermore, self-discharge of each of sub power storage devices 10-2 and 10-3 may occur. Therefore, if sub power storage devices 10-2 and 10-3 are not charged by using external power supply 28 for a long time, sub power storage devices 10-2 and 10-3 may go into the overdischarge state. SC shown in FIG. 3 indicates the SOC when sub power storage device 10-2 (and 10-3) has reached the overdischarge state. After sub power storage device 10-2 (and 10-3) is electrically disconnected from second converter 12-2, SOC2 (and SOC3) approaches SC gradually.

Thus, in the present embodiment, when the SOC of at least one of the two sub power storage devices falls below a predetermined value S1, this sub power storage device is selected as the power storage device to be charged. The sub power storage device to be charged is connected to second converter 12-2 by connecting unit 18. Furthermore, the HV mode is selected as the travel mode. It is to be noted that the SOC control target of the sub power storage device (sub power storage device to be charged) in the HV mode is the same as control target SA of the SOC of the main power storage device.

ECU 22 selects the sub power storage device to be charged and sets the travel mode to the HV mode when the vehicle ends traveling. In the next traveling, the travel mode is fixed in the HV mode.

In the HV mode, engine 36 operates as appropriate and first MG 32-1 generates electric power. The electric power generated by first MG 32-1 is supplied to the sub power storage device (sub power storage device to be charged) to charge this sub power storage device. As a result, overdischarge of the sub power storage device can be prevented.

Furthermore, predetermined value S1 is a value between SOC control target SB of the sub power storage device and the SOC corresponding to the overdischarge state of the sub power storage device. Therefore, the possibility that the sub power storage device is charged before the sub power storage device reaches the overdischarge state can be increased.

Furthermore, SOC control target SA of the sub power storage device (sub power storage device to be charged) in the HV mode is larger than the SOC control target (SB) for switching from the EV mode to the HV mode. At a point in time when the sub power storage device (sub power storage device to be charged) is connected to second converter 12-2, the SOC of the sub power storage device to be charged is smaller than SA. Therefore, the electric power generated by first MG 32-1 is supplied preferentially to the sub power storage device. Therefore, the possibility that the sub power storage device is charged can be further increased. Furthermore, by making the control target of the SOC of the sub power storage device to be charged higher than SB, more electrical energy is stored in the sub power storage device, as compared with the case where the control target of the SOC of the sub power storage device to be charged is set to SB. As a result, the possibility that the sub power storage device goes into the overdischarge state can be decreased.

Figure 4:
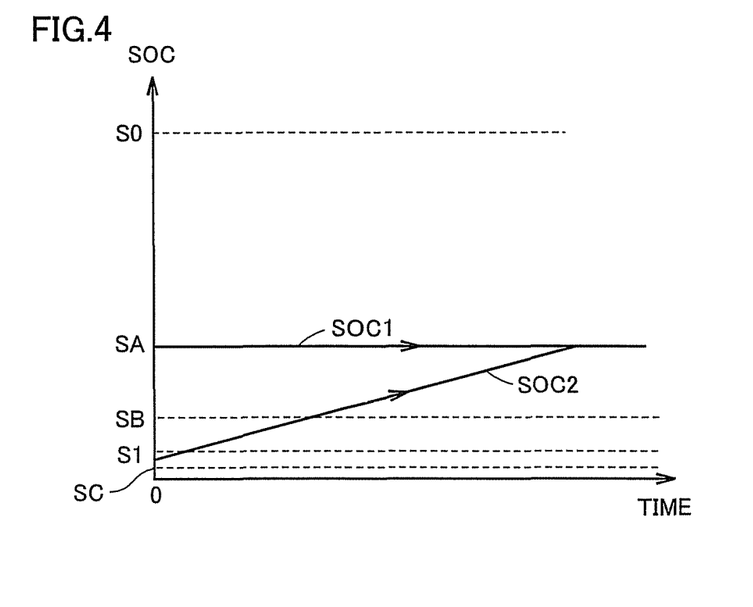
FIG. 4 is a conceptual diagram illustrating charging of a sub power storage device in an HV travel mode.

FIG. 4 is a conceptual diagram illustrating charging of the sub power storage device in the HV travel mode. FIG. 4 shows the case where sub power storage device 10-2 is selected as the sub power storage device to be charged. Referring to FIG. 4, the SOC of sub power storage device 10-2, that is, SOC2 is lower than predetermined value S1. Therefore, sub power storage device 10-2 is selected as the sub power storage device to be charged and the HV mode is selected. As the vehicle travels, sub power storage device 10-2 is charged. As a result, the SOC of sub power storage device 10-2 increases to approach control target SA. Therefore, overdischarge of sub power storage device 10-2 can be avoided.

After the SOC of sub power storage device 10-2 reaches control target SA, sub power storage device 10-2 is charged or discharged such that the SOC of sub power storage device 10-2 is kept at control target SA. In addition, the SOC of main power storage device 10-1 is controlled to be kept at control target SA.

Figure 5:
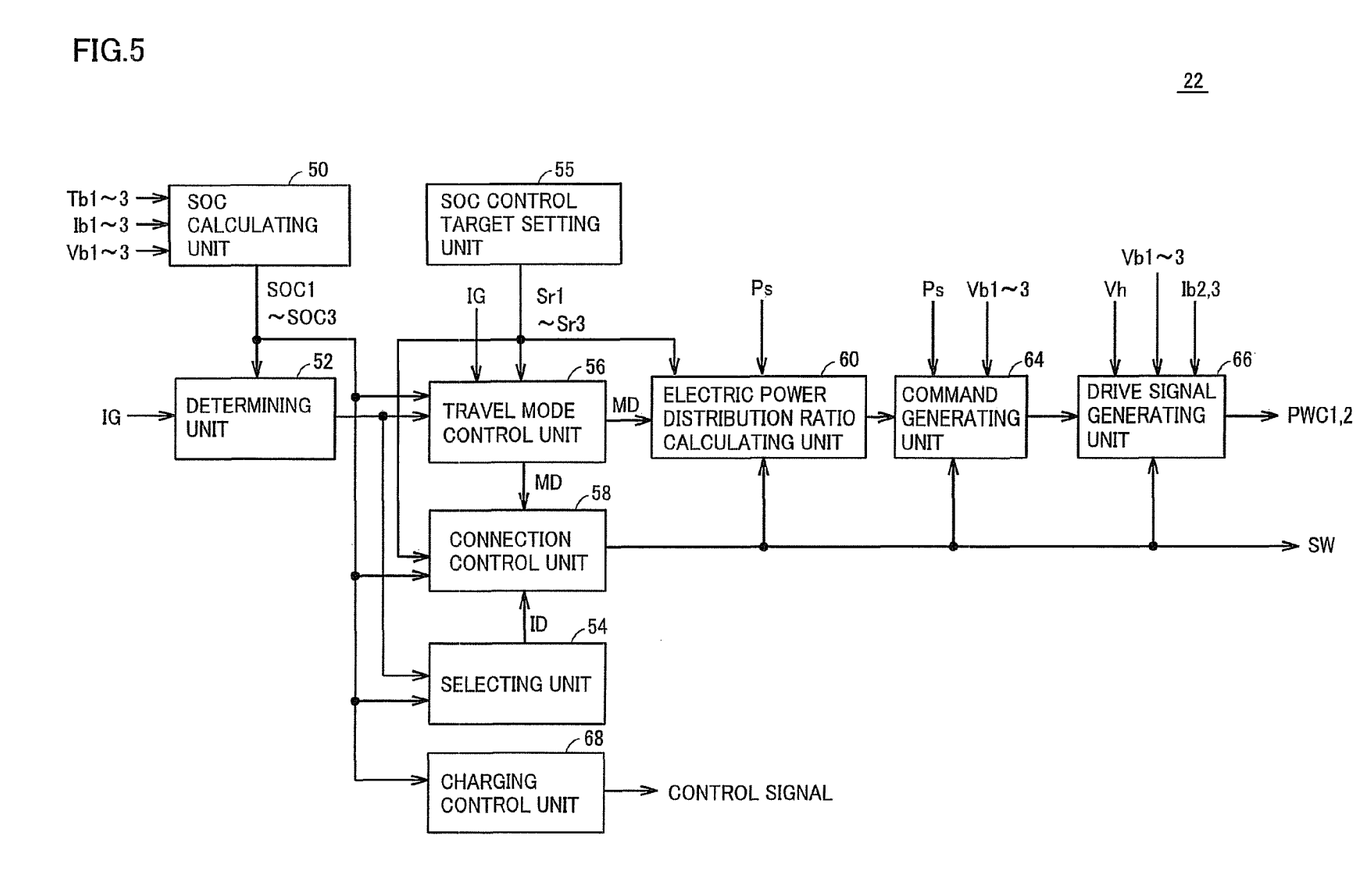
FIG. 5 is a functional block diagram illustrating a control configuration of an ECU for selection of a power storage device and for selection of a travel mode.

FIG. 5 is a functional block diagram illustrating a control configuration of the ECU for selection of a power storage device and for selection of a travel mode. It is to be noted that a circuit (hardware) having a function corresponding to each block shown in FIG. 5 may be formed inside ECU 22 or each block may be implemented by software processing executed by ECU 22 in accordance with a preset program.

Referring to FIG. 5, ECU 22 includes an SOC calculating unit 50, a determining unit 52, a selecting unit 54, a travel mode control unit 56, a connection control unit 58, an electric power distribution ratio calculating unit 60, a command generating unit 64, a drive signal generating unit 66, and a charging control unit 68.

SOC calculating unit 50 calculates SOC1, which is a remaining capacity estimated value of first power storage device 10-1, based on the respective detected values of temperature Tb1, current Ib1 and voltage Vb1. Furthermore, SOC calculating unit 50 calculates SOC2, which is a remaining capacity estimated value of second power storage device 10-2, based on the respective detected values of temperature Tb2, current Ib2 and voltage Vb2. Furthermore, SOC calculating unit 50 calculates SOC3, which is a remaining capacity estimated value of third power storage device 10-3, based on the respective detected values of temperature Tb3, current Ib3 and voltage Vb3. Since various known methods can be used as a method for calculating the SOC, detailed description thereof will not be repeated here.

Determining unit 52 determines whether or not the sub power storage device to be charged is included in sub power storage devices 10-2 and 10-3, when the state of signal IG is switched from the ON state to the OFF state or when the state of signal IG is switched from the OFF state to the ON state. Specifically, determining unit 52 determines whether or not the sub power storage device having a remaining capacity estimated value (SOC) that falls below predetermined value S1 is included in sub power storage devices 10-2 and 10-3, based on SOC2 and SOC3 calculated by SOC calculating unit 50.

Selecting unit 54 selects the sub power storage device having a remaining capacity estimated value (SOC) that falls below predetermined value S1, that is, the sub power storage device to be charged, from sub power storage devices 10-2 and 10-3, based on the result of determination by determining unit 52 as well as SOC2 and SOC3 calculated by SOC calculating unit 50. If determining unit 52 determines that the sub power storage device to be charged is included in sub power storage devices 10-2 and 10-3, selecting unit 54 selects any one of sub power storage devices 10-2 and 10-3 as the sub power storage device to be charged, based on SOC2 and SOC3. Then, selecting unit 54 outputs a variable ID indicating this sub power storage device to be charged.

More specific description will be given. When only the SOC of sub power storage device 10-2 falls below predetermined value S1, selecting unit 54 selects sub power storage device 10-2 as the sub power storage device to be charged. When only the SOC of sub power storage device 10-3 falls below predetermined value S1, selecting unit 54 selects sub power storage device 10-3 as the sub power storage device to be charged. When the SOC of sub power storage device 10-2 and the SOC of sub power storage device 10-3 both fall below the predetermined value, selecting unit 54 selects sub power storage device 10-2 or sub power storage device 10-3 having the smaller SOC, as the sub power storage device to be charged.

An SOC control target setting unit 55 sets SOC control targets Sr1 to Sr3 of main power storage device 10-1 and sub power storage devices 10-2 and 10-3, respectively. Specifically, in the travel pattern shown in FIG. 3, Sr1=SA and Sr2=Sr3=SB. In addition, in the travel pattern shown in FIG. 4, Sr1=Sr2=SA.

Travel mode control unit 56 selects any one of the EV mode and the HV mode, and outputs a signal MD indicating the selected mode. Travel mode control unit 56 controls the travel mode of the vehicle, basically based on comparison between SOC1 to SOC3 calculated by SOC calculating unit 50 and SOC control targets Sr1 to Sr3. While the vehicle is traveling, the EV mode is selected in a time period until all SOCs of the power storage devices used in the EV mode decrease to the SOC control targets. In the subsequent time period, the HV mode is selected.

When the vehicle ends traveling (when the state of signal IG changes from the ON state to the OFF state), travel mode control unit 56 selects any one of the EV mode and the HV mode. If determining unit 52 determines that the sub power storage device to be charged is included in sub power storage devices 10-2 and 10-3, that is, if the sub power storage device to be charged is selected, travel mode control unit 54 selects the HV mode. On the other hand, if determining unit 52 determines that the sub power storage device to be charged is not included in sub power storage devices 10-2 and 10-3, travel mode control unit 54 selects the EV mode.

When power supply system 1 is activated to cause the vehicle to start traveling (when the state of signal IG changes from the OFF state to the ON state), travel mode control unit 56 determines whether or not it is necessary to change the mode which is set when the vehicle ends traveling, based on the result of determination by determining unit 52. For example, when the SOC (SOC2) of sub power storage device 10-2 falls below predetermined value S1 when the vehicle ends traveling, the HV mode is selected as the travel mode. Assume that sub power storage device 10-2 is charged by using the external power supply during a time period over which the vehicle is at a stop, and the SOC (SOC2) of sub power storage device 10-2 exceeds predetermined value S1. In this case, determining unit 52 determines that the sub power storage device to be charged is not included in sub power storage devices 10-2 and 10-3. As a result, travel mode control unit 56 determines that it is necessary to change the mode which is set when the vehicle ends traveling, and selects the EV mode as the travel mode.

Connection control unit 58 generates control signal SW for controlling ON/OFF of switches RY1 and RY2 in connecting unit 18, in accordance with SOC2 and SOC3 calculated by SOC calculating unit 50, SOC control targets Sr2 and Sr3, and variable ID.

In the EV mode, control signal SW is generated such that the selected sub power storage device connected to second converter 12-2 is switched between sub power storage devices 10-2 and 10-3, based on comparison between SOC2 or SOC3 and Sr2 or Sr3. On the other hand, in the HV mode, switches RY1 and RY2 are controlled in accordance with whether variable ID is present or not. Specifically, if variable ID arises, that is, if the sub power storage device to be charged is selected, control signal SW is generated such that this sub power storage device to be charged is connected to second converter 12-2. On the other hand, if variable ID does not arise, that is, if the sub power storage device to be charged is not present, control signal SW is generated such that sub power storage devices 10-2 and 10-3 are both disconnected from second converter 12-2.

Electric power distribution ratio calculating unit 60 calculates the electric power distribution ratio used in the EV mode or the HV mode, based on signal MD from travel mode control unit 56, SOC1 to SOC3 calculated by SOC calculating unit 50, requested power Ps to power supply system 1, and control signal SW of the connection control unit.

Command generating unit 64 calculates a target electric power PR indicating a target value of the charging/discharging electric power of the selected sub power storage device connected to second converter 12-2, based on requested power Ps and the electric power distribution ratio.

Furthermore, command generating unit 64 sets a target voltage VR of voltage Vh. Here, when either sub power storage device 10-2 or 10-3 is electrically connected to second converter 12-2, voltage Vh must be made higher than a maximum value of voltages Vb1 to Vb3. In other words, a voltage higher than the maximum value of voltages Vb1 to Vb3 is set as a lower limit voltage of voltage Vh. Furthermore, in terms of MG control as well, a requested value of voltage Vh (requested voltage) is set in accordance with the operating state of first MG 32-1 and second MG 32-2. Therefore, when either sub power storage device 10-2 or 10-3 is electrically connected to second converter 12-2, command generating unit 64 sets, as target voltage VR, the higher one of the requested voltage in terms of MG control and the lower limit voltage. On the other hand, when sub power storage devices 10-2 and 10-3 are both electrically disconnected from second converter 12-2, command generating unit 64 sets target voltage VR in accordance with the requested voltage because it is unnecessary to take the lower limit voltage into consideration.

It is to be noted that command generating unit 64 can determine whether or not the sub power storage devices are all disconnected from second converter 12-2, based on control signal SW. In addition, the requested voltage in terms of MG control can be calculated at ECU 40.

Drive signal generating unit 66 generates drive signals PWC1 and PWC2 for driving first converter 12-1 and second converter 12-2, respectively, by using a method described below, based on the respective detected values of voltages Vh and Vb1 to Vb3 and currents Ib2 and Ib3, as well as target voltage VR and target electric power PR from command generating unit 64, as well as control signal SW. Then, drive signal generating unit 66 outputs generated drive signals PWC1 and PWC2 to first converter 12-1 and second converter 12-2, respectively.

Charging control unit 68 generates a control signal for controlling charger 26 (see FIG. 1), based on SOC1 to SOC3 calculated by SOC calculating unit 50. Charging control unit 68 outputs the control signal to charger 26.

Figure 6:
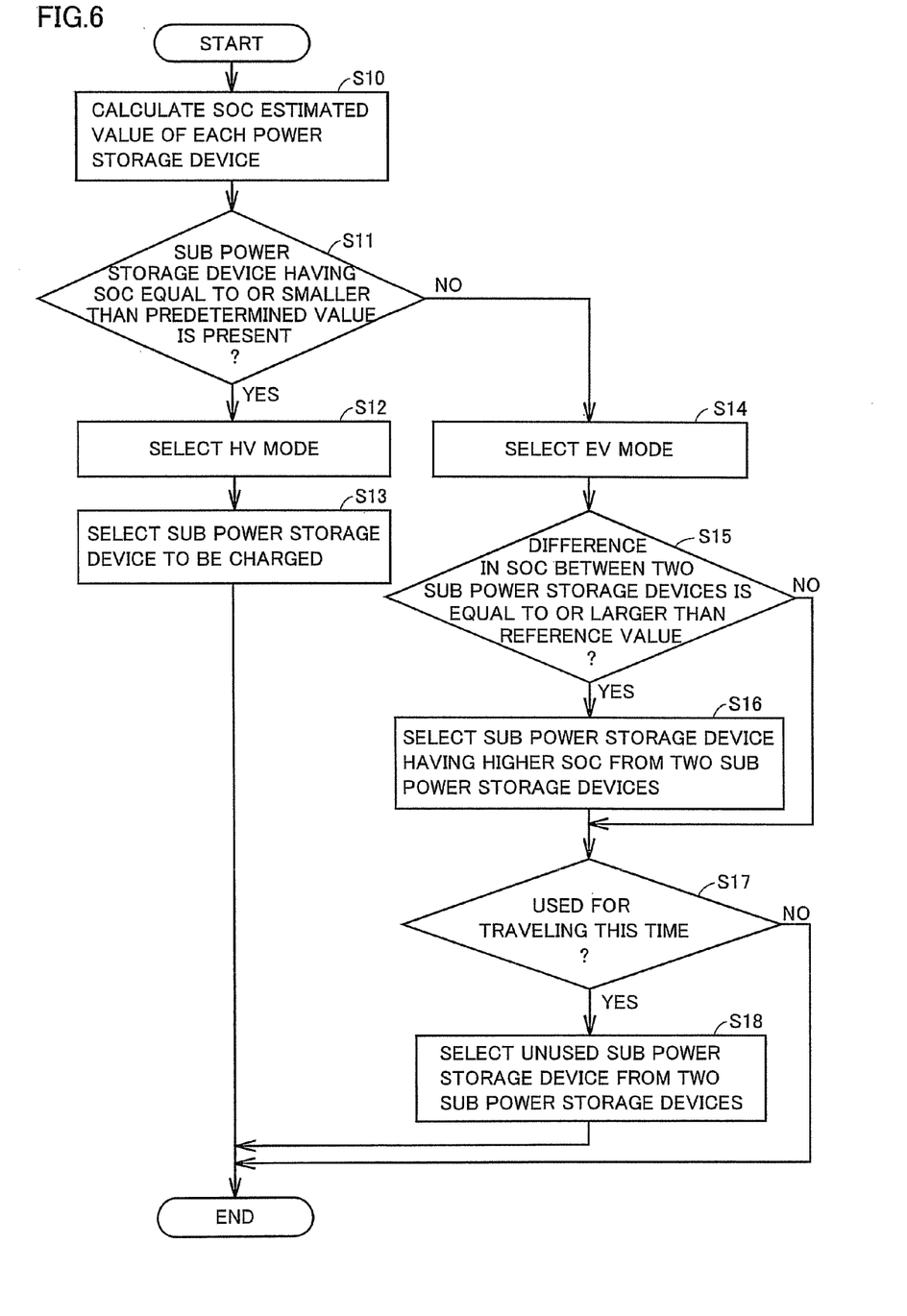
FIG. 6 is a flowchart illustrating processing for selecting a travel mode as well as a power storage device used when the electric powered vehicle travels.

FIG. 6 is a flowchart illustrating processing for selecting a travel mode as well as a power storage device used when the electric powered vehicle travels. The processing shown in this flowchart is performed at least when the vehicle ends traveling. The processing shown in the flowchart in FIG. 6 may, however, be executed not only when the vehicle ends traveling but also when the power supply system is activated.

Referring to FIG. 6, when the process starts, in step S10, ECU 22 calculates an SOC estimated value of each power storage device, based on the temperature, the current and the voltage of each power storage device. In step S11, ECU 22 determines whether a sub power storage device having an SOC equal to or smaller than predetermined value S1, that is, a sub power storage device to be charged is present or not, based on the calculated SOC estimated values of the sub power storage devices.

If ECU 22 determines that the sub power storage device to be charged is present (YES in step S11), ECU 22 selects the HV mode as the travel mode in the next traveling of the vehicle in step S12. Next, in step S13, ECU 22 selects the sub power storage device to be charged from sub power storage devices 10-2 and 10-3, based on SOC2 and SOC3. As a result, this power storage device to be charged (sub power storage device) is connected to second converter 12-2 in the next traveling of the vehicle. When the process in step S13 ends, the overall process ends.

On the other hand, if ECU 22 determines that a sub power storage device having an SOC equal to or smaller than the predetermined value is not present, that is, if the SOCs of both of the two sub power storage devices are higher than predetermined value S1 (NO in step S11), ECU 22 selects the EV mode as the travel mode in the next traveling of the vehicle in step S14. Next, in step S15, ECU 22 determines whether or not a difference in SOC between the two sub power storage devices is equal to or larger than a reference value. Although this reference value is not particularly limited, the reference value is defined as 10(%), for example.

If ECU 22 determines that a difference in SOC between the two sub power storage devices is equal to or larger than the reference value (YES in step S15), ECU 22 selects the sub power storage device having the higher SOC as the sub power storage device used for traveling of the vehicle in step S16. As a result, this sub power storage device is connected to second converter 12-2 in the next traveling of the vehicle.

If ECU 22 determines that a difference in SOC between the two sub power storage devices is less than the reference value (NO in step S15), ECU 22 determines in step S17 whether or not the sub power storage device is used for traveling of the vehicle this time. The use of the sub power storage device means charging or discharging of the sub power storage device. The sub power storage device is charged not only when the vehicle travels but also when the vehicle is connected to the external power supply. In step S17, it is determined whether or not the sub power storage device is used for traveling of the vehicle this time. For example, ECU 22 stores a history about dates when charger 26 was used and a history about dates when the electric powered vehicle traveled, and determines whether or not the sub power storage device is used for traveling of the vehicle, based on these histories.

If ECU 22 determines that the sub power storage device is used for traveling of the vehicle (YES in step S17), ECU 22 selects the sub power storage device that is not used this time, of the two sub power storage devices in step S18. When the two sub power storage devices are both used, ECU 22 selects the sub power storage device that was used first, for example.

When either the process in step S16 or the process in step S18 ends, the overall process ends. In addition, if ECU 22 determines that the sub power storage device is not used for traveling of the vehicle, that is, the sub power storage device is used for charging (NO in step S17), the overall process ends.

Figure 7:
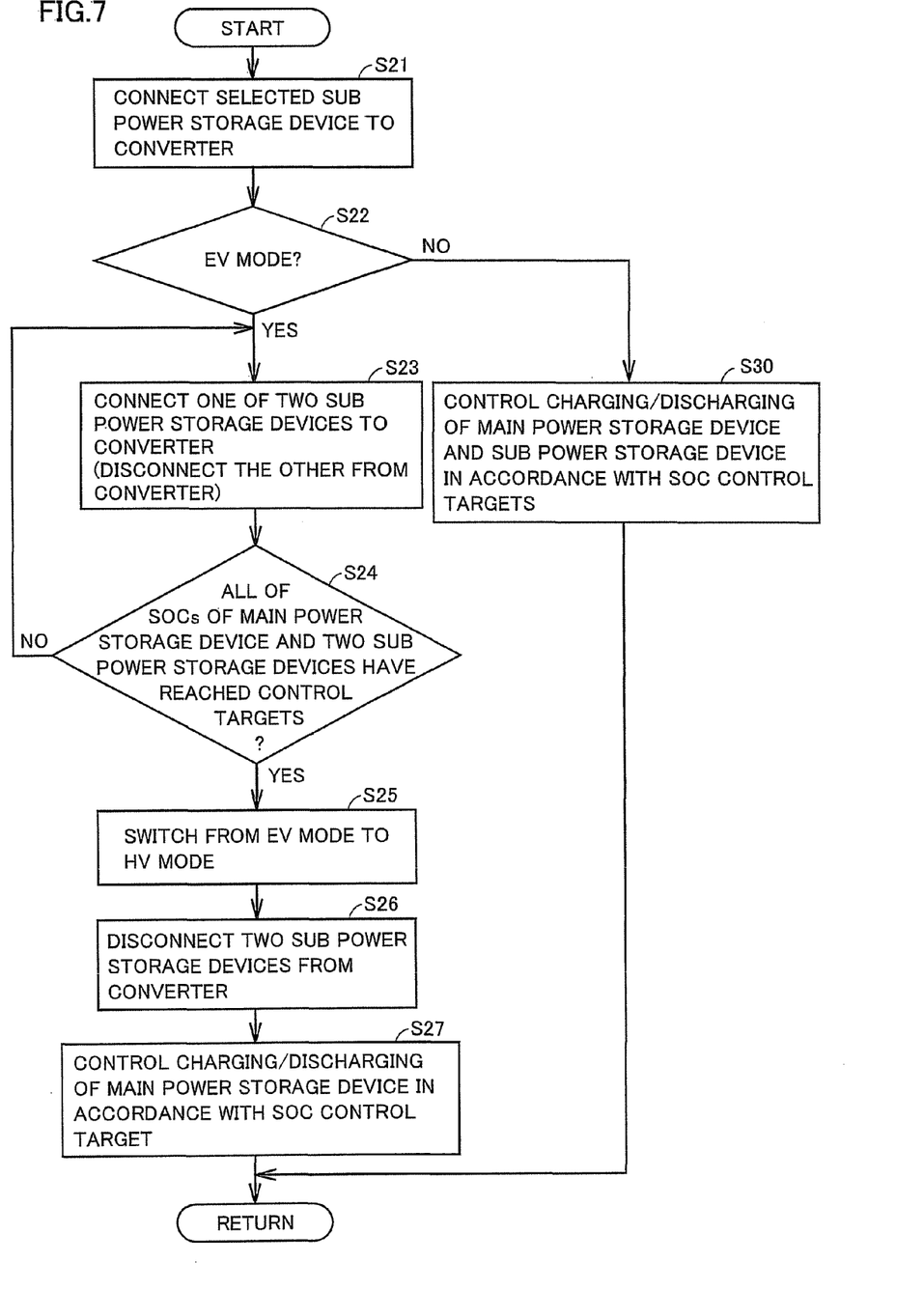
FIG. 7 is a flowchart for illustrating processing for controlling connection of the sub power storage devices when the vehicle travels.

FIG. 7 is a flowchart for illustrating processing for controlling connection of the sub power storage devices when the vehicle travels. The processing shown in this flowchart is executed after the processing shown in the flowchart in FIG. 6 ends, and more specifically, when the vehicle starts traveling.

Referring to FIG. 7, in step S21, ECU 22 controls connecting unit 18 to connect the selected sub power storage device to converter 12-2. The selected sub power storage device refers to the sub power storage device to be charged or the sub power storage device used for traveling of the vehicle. In step S22, ECU 22 determines whether or not the travel mode when the vehicle starts traveling is the EV mode.

If ECU 22 determines that the travel mode is the EV mode (YES in step S22), the process proceeds to step S23. If ECU 22 determines that the travel mode is not the EV mode, that is, if ECU 22 determines that the travel mode is the HV mode (NO in step S22), the process proceeds to step S30.

In step S23, ECU 22 controls connecting unit 18 such that any one of the two sub power storage devices 10-2 and 10-3 is connected to converter 12-2 and the other sub power storage device is disconnected from converter 12-2. In step S24, ECU 24 determines whether or not all of the SOCs of main power storage device 10-1 and sub power storage devices 10-2 and 10-3 have reached the control targets. If ECU 22 determines that all of the SOCs of main power storage device 10-1 and sub power storage devices 10-2 and 10-3 have reached the control targets (YES in step S24), the process proceeds to step S25. On the other hand, if ECU 22 determines that any one of the SOCs of sub power storage devices 10-2 and 10-3 does not reach the control target (NO in step S24), the process returns to step S23. Therefore, until the SOC of each of main power storage device 10-1 and sub power storage devices 10-2 and 10-3 reaches the control target, the processes in step S23 and step S24 are repeated. As a result, in the EV mode, one sub power storage device selected sequentially from the two sub power storage devices is connected to converter 12-2.

In step S25, ECU 22 switches the travel mode from the EV mode to the HV mode. Next, in step S26, ECU 22 controls connecting unit 18 to disconnect both of the two sub power storage devices from second converter 12-2. As a result, main power storage device 10-1 remains connected to first converter 12-1. In step S27, ECU 22 controls charging/discharging of main power storage device 10-1 in accordance with SOC control target SA of main power storage device 10-1.

On the other hand, in step S30, ECU 22 controls charging/discharging of main power storage device 10-1 and the sub power storage device (sub power storage device to be charged) in accordance with the SOC control target of main power storage device 10-1 and the SOC control target of the sub power storage device (sub power storage device to be charged). It is to be noted that when the process in step S30 is executed, the sub power storage device to be charged remains connected to converter 12-2.

As described above, in the power supply system for the electric powered vehicle according to the present embodiment, when the SOC of at least one of the two sub power storage devices is equal to or smaller than the predetermined value (value lower than the control target), this sub power storage device and the main power storage device are selected as the power storage device used in the next traveling of hybrid vehicle 100. Furthermore, the HV mode is selected as the travel mode. In the HV mode, engine 36 operates as appropriate and first MG 32-1 generates electric power. As a result, the sub power storage device is charged, and thus, overdischarge of this sub power storage device can be prevented.

In the present embodiment, the sub power storage device to be charged and the travel mode are selected after the vehicle ends traveling. The sub power storage device to be charged may, however, be selected and the travel mode may be set to the HV mode while the hybrid vehicle is traveling.

In addition, in the above embodiment, the configuration in which two sub power storage devices are arranged is described by way of example. Three or more sub power storage devices may, however, be arranged. In addition, the order in which a plurality of sub power storage devices are used in the EV mode is not particularly limited.

Furthermore, in the above embodiment, driving force generating unit 2 includes first MG 32-1 and second MG 32-2. The number of the MGs included in driving force generating unit 2 is not, however, limited to two.

Furthermore, the present invention is applicable to the electric powered vehicle equipped with the motor for generating vehicle driving force and the power storage device for storing electric power for driving the motor. Therefore, the present invention is applicable not only to the hybrid vehicle but also to an electric vehicle and the like, for example.

It should be understood that the embodiments disclosed herein are illustrative and not limitative in any respect. The scope of the present invention is defined by the terms of the claims, rather than the description above, and is intended to include any modifications within the scope and meaning equivalent to the terms of the claims.

REFERENCE SIGNS LIST 1 power supply system; 2 driving force generating unit; 5-1 to 5-3 monitoring unit; 10-1 main power storage device; 10-2, 10-3 sub power storage device; 12-1 first converter; 12-2 second converter; 18 connecting unit; 20 voltage sensor; 22 ECU (power supply system); 26 charger; 27 vehicle inlet; 28 external power supply; 30-1, 30-2 inverter; 32-1 first MG; 32-2 second MG; 34 power split device; 36 engine; 38 driving wheel; 42-1 chopper circuit; 50 SOC calculating unit; 52 determining unit; 54 selecting unit; 55 SOC control target setting unit; 56 travel mode control unit; 58 connection control unit; 60 electric power distribution ratio calculating unit; 64 command generating unit; 66 drive signal generating unit; 68 charging control unit; 100 hybrid vehicle; C, C1 smoothing capacitor; D1A, D1B diode; L1 inductor; LN1A power supply line; LN1B line; LN1C, MNL ground line; MPL power feed line; NL1 negative electrode line; PL1 positive electrode line; Q1A, Q1B power semiconductor switching element; RY1, RY2 switch; S0 initial value; S1 predetermined value; SA, SB, Sr1 to Sr3 control target

The invention claimed is:

1. A power supply system for an electric powered vehicle equipped with a motor serving as a power source and with an electric power generation mechanism configured to be capable of generating electric power while the vehicle is traveling, the power supply system comprising:
    a main power storage device configured to be rechargeable;
    a first voltage converter provided between said main power storage device and a power feed line electrically connected to said motor and said electric power generation mechanism, and configured to make bidirectional voltage conversion;
    a plurality of sub power storage devices provided in parallel to one another and each being rechargeable;
    a second voltage converter provided between said plurality of sub power storage devices and said power feed line, and configured to make bidirectional voltage conversion between one of said plurality of sub power storage devices and said power feed line;
    a connecting unit provided between said plurality of sub power storage devices and said second voltage converter, and configured to control connection and disconnection between said plurality of sub power storage devices and said second voltage converter;
    a charging unit configured to charge said main power storage device and each of said plurality of sub power storage devices by using a power supply outside said electric powered vehicle;
    a plurality of detecting units configured to detect states of said main power storage device and said plurality of sub power storage devices, respectively;
    a state of charge calculating unit configured to calculate a remaining capacity estimated value of each of said main power storage device and said plurality of sub power storage devices based on a result of detection by each of said plurality of detecting units;
    a selecting unit for selecting, as a sub power storage device to be charged, one sub power storage device having said remaining capacity estimated value that falls below a predetermined value, from among said plurality of sub power storage devices when said remaining capacity estimated value of any one of said plurality of sub power storage devices falls below said predetermined value; and
    a travel mode control unit having a first mode in which said electric powered vehicle travels by using electrical energy stored in said electric powered vehicle, and a second mode in which said electrical energy is maintained within a certain range by using said electric power generation mechanism, said travel mode control unit selecting said second mode when said sub power storage device to be charged is selected,
    the power supply system further comprising a connection control unit for controlling said connecting unit such that said sub power storage device to be charged is connected to said second voltage converter when said sub power storage device to be charged is selected, and
    said selecting unit selecting said sub power storage device to be charged when said electric powered vehicle ends traveling.

2. The power supply system for an electric powered vehicle according to claim 1, wherein each of said plurality of detecting units receives electric power from a corresponding power storage device and detects the state of said corresponding power storage device.

3. The power supply system for an electric powered vehicle according to claim 2, further comprising
    a control target setting unit configured to set a control target of a remaining capacity of each of said main power storage device and said plurality of sub power storage devices, wherein
    said predetermined value is smaller than said control target of each of said plurality of sub power storage devices and larger than a value of the remaining capacity corresponding to an overdischarge state of each of said plurality of sub power storage devices,
    said travel mode control unit selects said first mode until all of said remaining capacity estimated values of said main power storage device and said plurality of sub power storage devices decrease to respective said control targets, and selects said second mode after all of said remaining capacity estimated values decrease to respective said control targets, and
    said connection control unit connects one sub power storage device selected sequentially from among said plurality of sub power storage devices to said second voltage converter in said first mode, and disconnects each of said plurality of sub power storage devices from said second voltage converter in response to switching from said first mode to said second mode.

4. The power supply system for an electric powered vehicle according to claim 3, wherein said control target setting unit sets the control target of the remaining capacity of said sub power storage device to be charged to be higher than said control target of each of said plurality of sub power storage devices in said first mode, when said sub power storage device to be charged is connected to said second voltage converter.

* * * * *